United States Patent [19]

Wagar

[11] Patent Number: 5,440,734
[45] Date of Patent: Aug. 8, 1995

[54] SYSTEM FOR MSD RADIX SORT BIN STORAGE MANAGEMENT

[75] Inventor: Bruce A. Wagar, San Jose, Calif.

[73] Assignee: International Business Machines Corporation, Armonk, N.Y.

[21] Appl. No.: 121,812

[22] Filed: Sep. 14, 1993

[51] Int. Cl.$^6$ .......................... G06F 7/06; G06F 7/22; G06F 7/24
[52] U.S. Cl. .............................. 395/600; 364/DIG. 1; 364/222.9
[58] Field of Search ........................................ 395/600

[56] References Cited

U.S. PATENT DOCUMENTS

| | | | |
|---|---|---|---|
| 4,210,961 | 7/1980 | Whitlow | 395/600 |
| 4,809,158 | 2/1989 | McCauley | 395/600 |
| 5,218,700 | 6/1993 | Beechick | 395/700 |
| 5,396,622 | 3/1995 | Lee et al. | 395/600 |

Primary Examiner—Thomas G. Black
Assistant Examiner—John C. Loomis
Attorney, Agent, or Firm—Baker, Maxham, Jester & Meador

[57] ABSTRACT

A system and process for enhancing internal radix sorting bin storage efficiency by using linked blocks of contiguous storage space while controlling the number of partially-filled blocks required. The improved internal radix sorting procedure makes it possible to sort large computer files very efficiently without the risk of overflowing allocated storage space. A Most Significant Byte (MSD) radix sorting procedure avoids the collection step required in the LSD radix sorting procedure. The distribution pass is halted whenever a bin is found to contain less than a predetermined threshold number of records and the bin is then sorted immediately using a simple comparison-based sort. At each distribution rank, the system selects and sorts the smallest bins first, thereby quickly releasing storage blocks that may be required during the distribution sort passes for the larger bins. In this radix sorting procedure, the total number of linked storage blocks of size B can never exceed $(R/B)+(1-1/B)A$, where R is the total number of records to be sorted and $A=(M-1)\log_M (R/T)+\min(T,M)+1$, where M=key field digit radix and T=bin size threshold for switching to comparison-based sort completion.

16 Claims, 4 Drawing Sheets

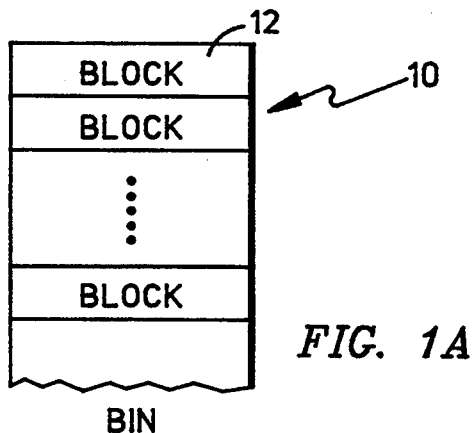
*FIG. 1A*
BIN
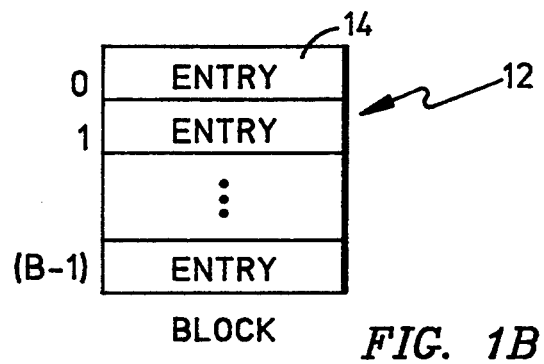
*FIG. 1B*
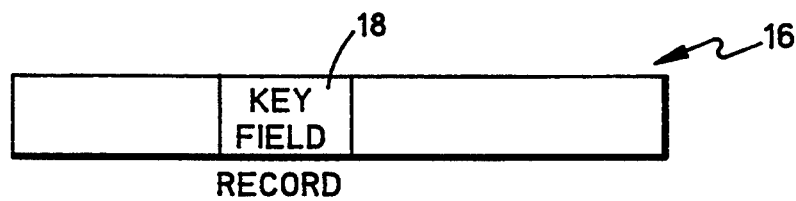
*FIG. 1C*
*FIG. 1D*
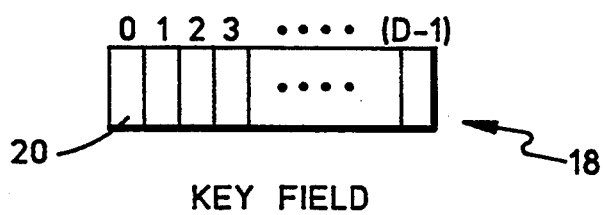

SYSTEM FOR MSD RADIX SORT BIN STORAGE MANAGEMENT

CROSS-REFERENCES TO RELATED APPLICATIONS

This patent application is related by common inventorship and subject matter to the copending application entitled "Adaptive External Sorting System", filed on even date herewith as patent application Ser. No. 08/121328 (Assignee Docket SA9-92-108), which is entirely incorporated herein by this reference.

BACKGROUND OF THE INVENTION

1. Field of the Invention

This invention relates to systems for distributive sorting and, more specifically, to a system for Most Significant Digit (MSD) radix sorting using linked lists of blocks of preallocated contiguous storage space as distribution bins that are processed according to a bin-count threshold priority scheme.

2. Description of the Related Art

Sorting is generally acknowledged to be one of the most time-consuming computer-implemented procedures. It has been estimated that over twenty-five percent (25%) of all computer running time is devoted to sorting. Many installations use over half of their available computer time for sorting. Numerous proposals and improvements have been disclosed in the art for the purposes for reducing sorting time and increasing sorting efficiency. Refer to, for instance, Harold Lorin, "Sorting and Sorting Systems", The Systems Programming Series, ©1975, by Addison-Wesley Publishing Co., pp. 143–166, for a discussion of distributive sorts and especially pp. 148–158 for a discussion on radix or digit sorting.

The classical sorting procedure known in the art sorts a group of data records into a sequence specified by an identifying key assigned to each record. For small numbers of records, a first class of sorting procedures having minimal overhead steps unrelated to record numbers are most efficient. This first class includes the insertion, selection and bubble sorts and generally includes the simplest procedures requiring a sorting time proportional to the square of the size of the group of records to be sorted ($R^2$). A second class of sorting procedures are most efficient for intermediate group sizes of up to 100,000 records. This second class of procedures requires sorting time proportional to $R \log_2 R$ and includes the Quicksort and Heapsort procedures known in the art. A third class of sorting procedures are generally useful for very large groups of records because they can be efficiently implemented with modern computers and require a sorting time proportional to $DR$, where $D$ is the number of sort key digits and $R$ is the number of records in the group, but these procedures also require substantial number-independent procedural steps. This third class includes all types of bin or bucket sorting, including the radix sort. The high fixed computational overhead unrelated to the size of the record group to be sorted makes this third class of procedures less efficient for small groups of records.

The well-known radix sorting procedure employs one of two available approaches. Both proceed by first breaking up each key field into "digits" or bytes. Each key field in a group is then distributed to one of M bins selected in accordance with the value of one of the key digits, where M is the digit radix. After the group is completely distributed among M subgroups or bins, the distribution process is repeated for each subgroup in turn for another key digit. The process concludes when the smallest subgroups are transferred in order to an output area. Depending on the approach selected, the distribution of key field representations starts either according to the Least Significant Digit (LSD) or the Most Significant Digit (MSD) in the key field. The main difference between these two approaches is the key field scanning direction.

Traditional radix sorting proceeds from the LSD to the MSD in the key field. By including a small amount of additional overhead processing steps, the radix sort can proceed from the MSD to the LSD of the key field, as is known in the art. The primary drawback of LSD radix sorting is that the procedure is insensitive to the data so the number of distribution passes is always equal to the number of "digits" or bytes in the key field regardless of opportunities for short-cuts arising from the data distribution. With MSD radix sorting, records are first distributed according to the MSD value in the key field. Records with the same MSD are thereby grouped within the same bin. Each of the bins may then be sorted independently of the other bins at the same level or rank without the recombination step required in the LSD sort. As the distribution proceeds down the key ranks, the number of key fields with identical MSD strings within a bin becomes smaller and smaller. The records within a bin are completely sorted when either the LSD is examined or the bin has a single record. This way, the distribution pass sometimes terminates along certain branches of the distribution tree before reaching the LSD level. Thus, the MSD radix sort is often quicker than the LSD radix sort, exploiting opportunities for efficiency arising from data characteristics because the number of distribution passes is not fixed at the maximum.

The MSD radix sort procedure requires that the unsorted bins in each rank be maintained in storage while completing the recursive radix sort for a single bin. The process continues recursively through the key field digits until all records in the first bin in the first rank are sorted. Then the second bin in the first rank is distributed recursively according to the second MSD, the third MSD, etc., the third bin in the first rank is similarly distributed and so forth. Every group of record keys generates up to M new subgroups of next rank during distribution (M=the radix of each key digit). Each of the subgroups is then sorted on the next MSD to create a series of lower ranks. The entire process forms a tree where the root represents the original group of record keys, the interior nodes represent subgroups subject to further distribution passes and the leaf nodes represent the final single element or LSD sort bins. Because the MSD radix sort is a depth-first procedure, the unsorted bins at each rank must be maintained in memory awaiting completion of the deep distribution pass for each preceding bin sort. This requirement imposes significant storage management problems.

Traditional radix sorting procedures use linked lists of records to implement the bin storage. After several distribution passes, it is likely that the records in any particular bin are scattered throughout memory. Most modern computer systems suffer performance degradation because of such fragmented storage.

A better bin storage approach in the art consists of implementing the bins as linked lists of predetermined contiguous storage "blocks", where each block is a fixed-sized contiguous section of memory with space for several "entries". The entries can be either the records themselves or something smaller in size such as pointers that can be used to sort the records. The blocks are initialized at the beginning of the radix sort procedure and are assigned to bins as needed. That is, when the blocks currently assigned to a bin are full, a new block is assigned to the bin. Each block is reclaimed when its entries are distributed into other bins or to the output area. Reference is made to copending patent application Ser. No. 07/813,246 filed on Dec. 23, 1991 (Assignee Docket SA9-91-016), entirely incorporated herein by this reference, wherein Kai-Wan Lee et al. disclose an MSD sorting method using a dynamic branching table to eliminate the steps of collecting empty subgroups during the recursive dispersion phase.

While this approach improves processor efficiency by reducing storage fragmentation, there is no known solution to the prospect of creating too many partially-filled blocks, thereby overflowing the predetermined block space available in memory. Because no "bin" contains more than one partially-filled "block", this problem arises only when too many bins are created during the sorting procedure. In the worst case, each bin contains only a single record representation. Thus, to absolutely ensure against "block overflow" during a MSD radix sort procedure, one block must be allocated for each record in the original group of records to be sorted. This leads to an allocation of unacceptably large numbers of memory blocks and destroys the processor efficiency advantages of the block storage technique.

There is accordingly a clearly-felt need in the art for an improved radix sorting procedure that permits the efficient sorting of large data record files without the risk of storage overflow. The efficiency advantages of the linked block list improvement to the MSD radix sorting procedure does not meet this need because of the potential for storage overflow. These unresolved problems and deficiencies are clearly-felt in the art and solved by this invention in the manner described below.

SUMMARY OF THE INVENTION

The system of this invention solves the radix sort block storage management problem by first selecting the smallest unprocessed bin remaining in the present rank for further distribution. The system of this invention also halts each distribution pass when a bin contains less than a predetermined threshold number of records and substitutes a simple comparison sorting procedure to complete the record sort within the subthreshold bin. First completing the sort for all subthreshold bins releases their storage blocks immediately. Subsequent processing of the larger bins in order of size, fewest entries first, minimizes the number of subsequent bins immediately created, which in turn minimizes the number of blocks required simultaneously. These two improvements require the addition to each bin of a "bin count index" representing the total number of records in the original group that sort ahead of the first record in the bin. This permits the sorted contents of each bin to be immediately transferred to the proper location in the output area of storage. The bin count index (BCI) value is computed immediately following the distribution pass that created the bin by adding the number of records in the immediately previous bin to the BCI of the bin before that.

It is an object of this invention to improve the radix sorting procedure to permit the internal sort of large computer files without any possibility of overrunning allocated storage space. It is an advantage of the system of this invention that it attains the desired objective with little increase in fixed sort procedure overhead.

It is another object of the system of this invention to improve radix sorting procedure efficiency. It is a feature of the system of this invention that the radix sort tree is generated beginning with the Most Significant Digit (MSD) of the key field, thereby exploiting whatever procedural efficiency is available from the distribution of record key field values. It is an advantage of the method of this invention that immediate sort completion for bins having fewer than a threshold number of record entries increases sorting speed at the lower ranks of the sort tree and improves storage efficiency.

It is yet another advantageous feature of the system of this invention that the sort bin entries are organized in blocks of contiguous storage, thereby improving host processor memory access efficiency.

The foregoing, together with other objects, features and advantages of this invention, will become more apparent when referring to the following specification, claims and the accompanying drawing.

BRIEF DESCRIPTION OF THE DRAWING

For a more complete understanding of this invention, reference is now made to the following detailed description of the embodiments as illustrated in the accompanying drawing, wherein:

FIGS. 1A, 1B, 1C and 1D show the relationship between radix sorting bins, contiguous storage blocks, record entries and record fields used to describe the invention herein;

DETAILED DESCRIPTION OF THE PREFERRED EMBODIMENTS

Glossary of Symbols

Figure 2:
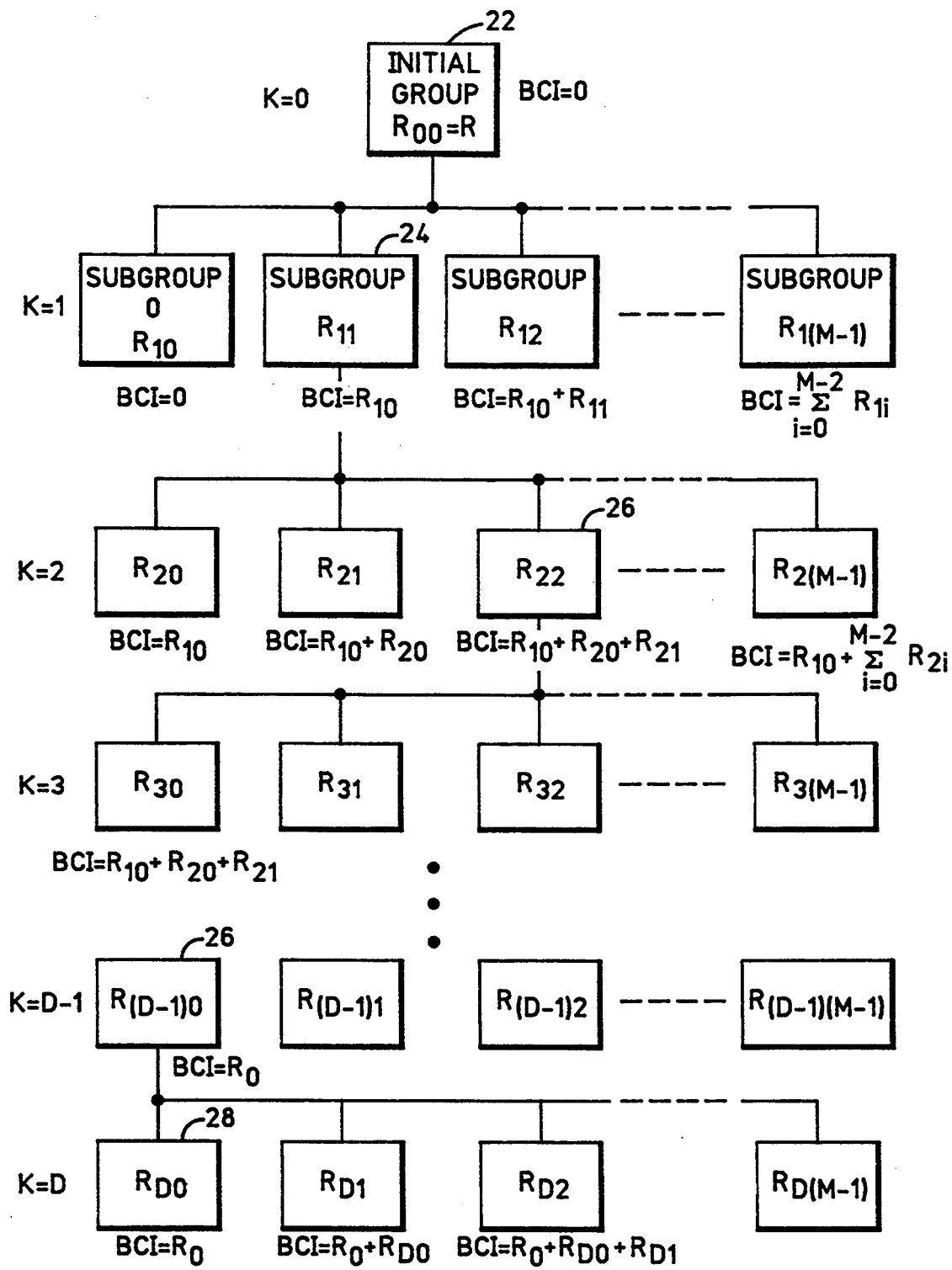
FIG. 2 provides an illustrative example of the MSD radix sort tree showing the method of this invention.

The following symbols used herein are defined as follows:

R = the total number of records in a group to be sorted;
D = the number of digits in the key field of each record;
M = the radix or number of possible values for each key field digit;
A = the maximum number of active bins required in memory at any point during the distribution sort;
T = the threshold number of bin entries required to force distribution into the next sort tree rank;
B = number of entries that are stored in a single block of contiguous memory;
K = the sort tree level or rank of the bin currently being sorted;
$S_k$ = the number of bins awaiting distribution at level k ($1 \leq k \leq K$);
$S = S_1 + S_2 + \ldots + S_K$ = the total number of active undistributed bins in memory;
$P = (S_1+1)(S_2+1) \ldots (S_K+1)$ = the product of the total number of bins at each level either awaiting distribution or on the path from the root group to the bin currently being sorted; and $BCI_k$=bin count index=the number of entries in the root group of records that are smaller than every record in the $k^{th}$ bin.

Description of the Improved MSD Sorting Procedure

FIG. 1, including FIGS. 1A–1D, shows the relationship between the various terms used herein to denominate storage of data. FIG. 1A shows a storage bin 10 that consists initially of a linked list of blocks of contiguous storage exemplified by the block 12. The logically-contiguous blocks in bin 10 need not be contiguous to one another in memory address-space. FIG. 1B provides a detailed illustration of block 12 from FIG. 1A. Block 12 includes contiguous storage space sufficient to hold a plurality B of entries exemplified by entry 14. FIG. 1C illustrates a data record 16 having a key field 18. Data record 16 may contain substantially more than key field 18, which is used to establish the sort order position for record 16. Entry 14 may be any useful representation of key field 18 known in the art, such as key field 18 itself or an address pointer referring to key field 18 stored elsewhere in memory. Entry 14 may also include other data in addition to a representation of key field 18. FIG. 1D illustrates key field 18 in more detail, showing a plurality D of digits, exemplified by the Most Significant Digit (MSD) 20. Each digit exemplified by digit 20 may assume any of a plurality M of values. As used herein, M is denominated the "radix" of digit 20. All digits in key field 18 are herein presumed to be of the same radix M.

FIG. 2 is an example of a radix distribution sort tree that illustrates the recursive characteristics of the radix distribution sort procedure of this invention. This MSD radix sort is a depth-first process. That is, when a bin at rank K is processed, the M new bins formed at the lower rank K+1 are first completely distributed before processing a second bin of rank K. Referring to FIG. 2, the root of the MSD distribution tree represents the bin 22 for the initial record group. Bin 22 has a Bin Count Index (BCI) of zero because it contains the entire plurality R of records to be sorted. Thus, there are no records in the initial group having a key field value less than the least key field in bin 22. Also, note that bin 22 is assigned rank K=0 because there has been no distribution.

The Most Significant Digit (MSD) of each key field represented in bin 22 is next tested and the entries in bin 22 are distributed into a plurality M of subgroup bins at rank K=1. These subgroup bins are exemplified by bin 24, which contains all key field entries wherein the MSD=1. Following distribution of the plurality R entries from rank K=0 to rank K=1, the BCIs are computed for each subgroup at rank K=1. The lowest-valued subgroup in rank K=1 has the same BCI value as parent bin 22. Subgroup bin 24 has a BCI value equal to the sum of the BCI for parent bin 22 and the number of entries in all lower-valued bins of rank K=1. The BCI values are similarly computed for all other bins in rank K=1, as may be appreciated by examining FIG. 2.

According to the method of this invention set forth below, all bins at rank K=1 are next ordered from the fewest number of entries (smallest) to the largest. The smallest bin is first selected for subsequent processing. In FIG. 2, bin 24 is found to be the smallest bin (having the fewest number of entries) of all bins in rank K=1. Thus, bin 24 is first selected for subsequent processing. All other bins at rank K=1 are held in memory as "active" bins awaiting distribution. After the following processing is completed, the next larger bin at rank K=1 is selected for processing.

In FIG. 2, bin 24 is distributed to the next rank K=2 of bins according to the second MSD in each key field. Thus, for example, the bin 26 at rank K=2 contains only those record entries having a MSD=1 and a second MSD=2. The BCI for each bin in rank K=2 is then computed in the manner discussed above. The bin containing zero-valued second MSDs adopts the same BCI value as parent bin 24 (BCI=$R_{10}$). Bin 26 is assigned a BCI equal to the sum of the BCI for parent bin 24 and the number of entries contained in all lower-valued bins at rank K=2. Finally, all bins at rank K=2 are reordered by size according to the number of entries and, in FIG. 2, bin 26 is found to contain fewer entries than all of the bins in rank K=2.

Bin 26 is next distributed to rank K=3 in the same manner. All other rank K=2 bins are held in memory awaiting later processing. The smallest bin in K=3 is then distributed to rank K=4 and so forth until rank K=D−1. The smallest bin in rank K=D−1 is found to be bin 26, which is first distributed to the final rank K=D according to the $D^{th}$ MSD of the entry key fields, which is also denominated the Least Significant Digit (LSD). Because all entries in a bin at rank K=D have identical key field values, the contents of each bin are immediately written to the output area at a location specified in accordance with the BCI value for the bin. For instance, the bin 28 entries are written to the output area at a location corresponding to the BCI value of the parent bin 26. This feature of the method of this invention ensures that the key field entries are properly located in the output area without requiring them to be output in sort order. That is, the final sorted records can be moved to the output area in any order so long as they are assigned to a location corresponding to the appropriate BCI. Note that many bins, each containing a linked list of blocks (FIG. 1A), are active at this point in the procedure.

Figure 3:
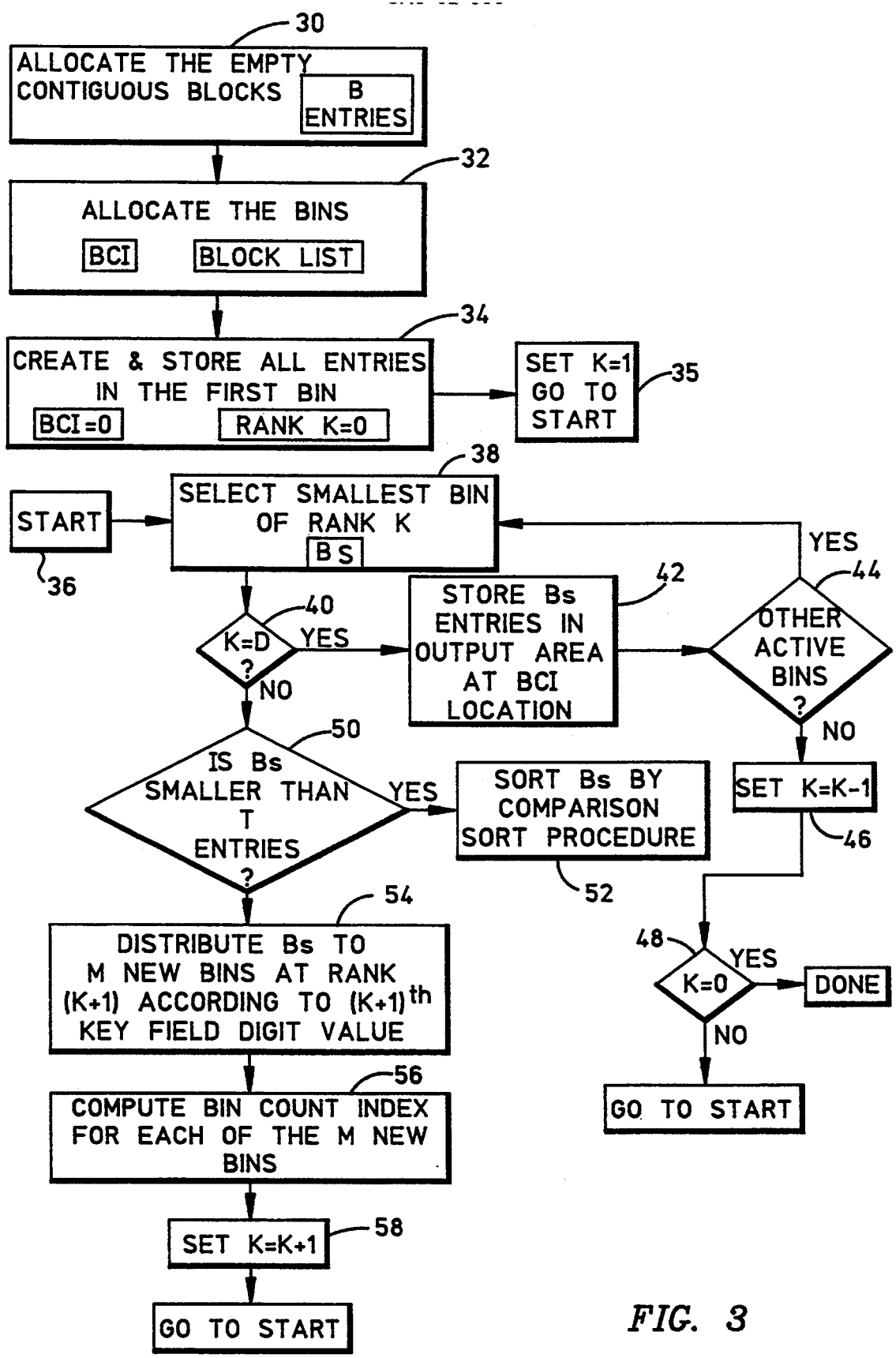
FIG. 3 is a block diagram of an illustrative embodiment of the method of this invention.

FIG. 3 provides a block diagram of the preferred MSD sorting procedure of this invention. A first step 30 allocates a plurality of blocks of contiguous storage space in a data storage means. Each block is allocated to hold B entries. Each entry represents one record and may contain either the key field itself or enough information to identify and sort the record. Each block provides for linkage to another block and the empty blocks may be maintained in a special free list. Every block is initialized without contents and these empty blocks are each assigned to bins whenever a record is added to a bin and the bin has no room left in the presently-linked blocks. A block becomes empty again and is returned to the free list whenever all B entries in the block are distributed to other blocks or moved to the output area.

In a second step 32, the bin storage space is allocated. Each bin contains a linked list of the storage blocks from step 30 that hold the key field representations for that bin. This list initially is empty and never contains more than one partially-filled block. All but one block in each bin is completely filled with entries. Each bin also contains a Block Count Index (BCI) that represents a count of the number of input data records that have key fields that are smaller than the key field for every record in the bin.

The first bin has BCI set to zero and subsequent bin BCIs are computed following the completion of the distribution pass that creates the bin. The BCI is introduced by the method of this invention to establish where the bin records are located in the output area. This location information is necessary to permit the bins at each rank to be sorted and output in order of size instead of key field value. All records in the original group to be sorted must be known to permit computation of BCI. In the next step 34, the original group of key field entries is created and stored in the first bin of rank K=0, and the BCI for the first bin is set to zero. In step 35, rank index K is incremented to K=1, completing the initialization portion of the procedure of this invention. The sorting portion of this procedure begins with the "START" step 36.

The recursive process beginning with step 36 sorts each bin shown in the distribution sort tree of FIG. 2. Each recursion creates a plurality M of bins at a new rank K=K+1 and distributes the contents of the rank K bin based on the $(K+1)^{th}$ key field digit value, where M is the key field digit radix (M=10 for a decimal digit and M=8 for an octal byte). The process beginning at step 36 in FIG. 3 is now described in detail.

A first step 38 examines all active (unsorted and nonempty) bins having rank K (FIG. 2) and selects the bin having the fewest entries ("smallest" bin). This bin is denominated bin $B_s$ in FIG. 3. After selecting bin $B_s$, the value of rank K is tested in step 40 for equality to D, which is the number of digits in the key field of each record. If K=D, then all of the records in bin $B_s$ must have the same key field value and are immediately moved and stored into the output area in step 42. The output area storage location for these records corresponds to the BCI value for bin $B_s$. After completion of step 42, the $K^{th}$ rank of the sort tree is searched for other active bins in step 44. If other active bins remain in rank K, the procedure returns to step 38 as shown in FIG. 3. If bin $B_s$ is the last unsorted bin in rank K, step 44 then is followed by step 46, where rank K is decremented by one. After decrementing, K is tested for K=0 in step 48. If K=0, the recursion procedure is complete and halts. If K≠0, the procedure returns to START step 36 with the new rank K value.

Returning to step 40, if K≠D, then bin $B_s$ is tested against a predetermined threshold number of entries T. If bin $B_s$ has less than T entries, the recursive distribution sort procedure is terminated at $B_s$ for that branch of the sort tree and the contents of bin $B_s$ are immediately sorted in step 52 using a comparison-type sorting procedure such as the insertion sort. Because all entries in bin $B_s$ are completely sorted in step 52, they are immediately moved to the output area in step 42 as discussed above. Decision step 50 eliminates the distribution sort overhead for bin $B_s$ whenever the size of $B_s$ is small enough to permit more efficient comparison-type sorting. The decision is made dynamically and can be adjusted by controlling the threshold value T. Also, because the smaller bins at each rank are sorted first, the blocks of storage space assigned to the smaller bins are immediately recovered to the free list before proceeding to distribute the larger active bins into lower levels of the sort tree, which consumes more of such empty blocks.

After sorting or distributing the smaller bins in rank K, the procedure selects the smallest of the larger active bins. If bin $B_s$ is larger than T entries, it is distributed into the new rank K+1 in distribution step 54. Each entry in bin $B_s$ is moved into a new bin at rank K+1 according to the $K^{th}$ key field digit value as discussed above in connection with FIG. 2.

Following completion of distribution step 54, the BCI is computed in step 56 for each of the M new bins at rank K+1. Step 56 is a straightforward procedure where the BCI for the Digit=0 bin is set to the BCI for bin $B_s$ and the Digit=1, 2, . . . , M bin BCIs are computed by adding the number of entries in the lower bins to the $B_s$ bin BCI value, as discussed above in connection with FIG. 2.

After step 56 is completed, the procedure increments rank K to K+1 in step 58 and returns control to START step 36. FIG. 3 demonstrates that the recursive distribution sorting procedure can be terminated anywhere along any branch of the sort tree if the bin size falls below T entries or if the data characteristics are such that bin $B_s$ contains only one entry or a plurality of identical key field entries. These early terminations substantially improve the sorting efficiency over the traditional LSD distribution sorting procedure.

Figure 4A:
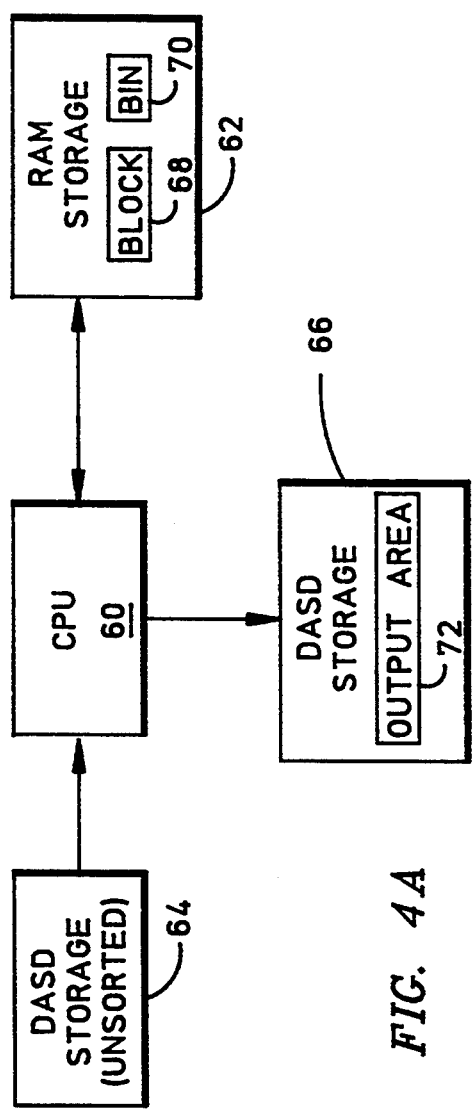
FIGS. 4A and 4B show functional block diagrams of an illustrative embodiment of the system of this invention.
Figure 4B:
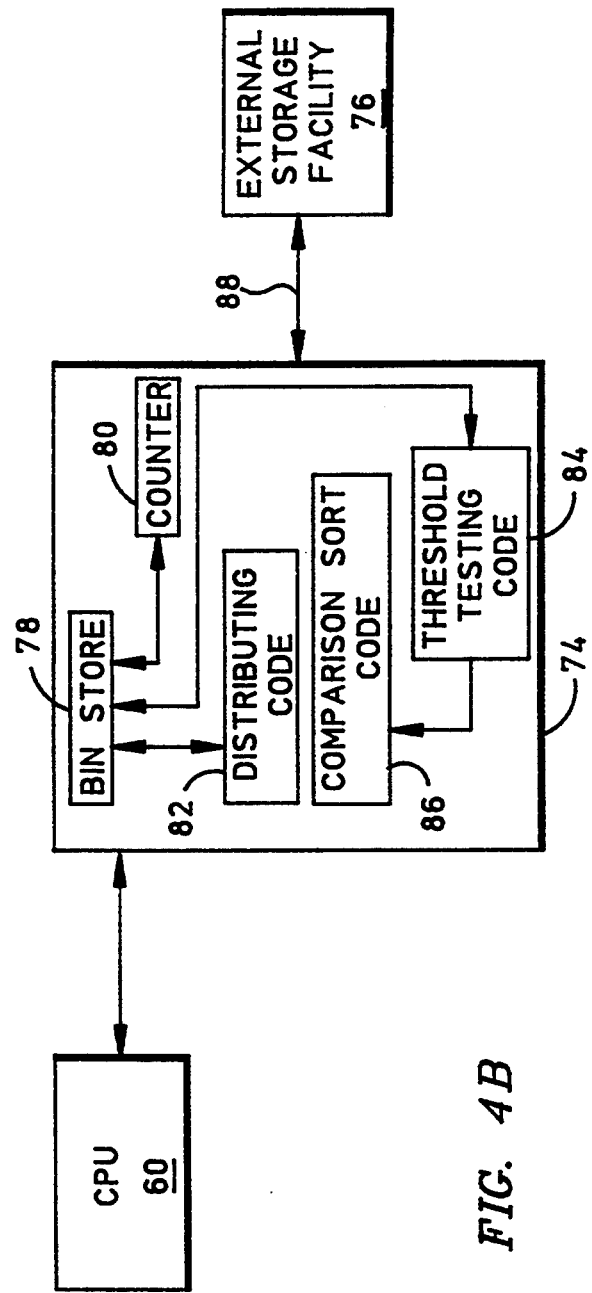

FIGS. 4A–4B show functional block diagrams of two exemplary systems for implementing the sorting procedure of this invention described above in connection with FIG. 3. In FIG. 4A, a central processing unit (CPU) 60 is coupled to a Random Access Memory (RAM) storage device 62 and two Direct Access Storage Device (DASD) storage facilities 64 and 66. RAM 62 includes at least one block of contiguous storage space 68 and at least one distribution sorting bin 70. DASD 64 contains a first group of unsorted records, each having a key field (FIG. 1). DASD 66 includes an output area 72 for receiving the first group of records in sorted order.

FIG. 4B shows another example of a system suitable for executing the procedure discussed above in connection with FIG. 3. CPU 60 is coupled to an internal data storage facility 74, which is in turn coupled to an external storage facility 76. The first group of unsorted records and the output area for storage of the sorted record group is located in external storage facility 76. Internal data storage facility 74 contains several objects required for performing the distribution sorting procedure of this invention.

In facility 74, the bin store 78 provides storage management and space for the distribution sort bins. A counter 80 is coupled to bin store 78 to compute the BCI representing the number of key fields that are smaller than the minimum key field in each bin and to store the BCI in each bin. A distributing code 82 is coupled to bin store 78 to distribute the entries in each bin to a plurality M of bins at the next lower rank K=K+1, as discussed above in connection with FIG. 3. The threshold testing code 84 is also coupled to bin store 78 to test each sort bin against a predetermined threshold T and to determine whether the bin is to be distributed in accordance with code 82 or immediately sorted in accordance with the comparison sort code 86. Comparison sort code 86 sorts the contents of a bin using at least one of the several useful comparison-based sorting procedures known in the art, such as the insertion sort. The unsorted first group of records (not shown) from external storage facility 76 is entirely transferred to internal data storage facility 74 for sorting on the bus 88. The sorted records (not shown) are returned on bus 88 in single-bin increments to external storage facility 76.

Analysis of Sorting Bin Storage Management

The distribution sorting procedure of this invention is a depth-first process. When a bin $B_s$ is sorted, M new bins are formed as a result of distributing $B_s$. These bins are formed before processing any other active bins awaiting distribution. This procedure can be described as a tree, as discussed above in connection with FIG. 2. Using the sort tree in FIG. 2, the processing can be analyzed as follows. A bin $B_s$ is denominated herein as "active" when $B_s$ is awaiting distribution, $B_s$ is currently being distributed, or $B_s$ is being created from the distribution of another bin and has already received at least one record.

Because only active bins can contain records, only active bins can contain blocks. Moreover, an active bin can contain at most only one partially-filled block and the remaining blocks in the bin must be completely full. Careful study of the tree in FIG. 2 shows that there can be at any time during the distribution sorting procedure of this invention at most $(M-1)(D-1)+D+1=M(D-1)+2$ active bins. Accordingly, at any time there can be no more than $M(D-1)+2$ partially-filled blocks linked to the sort tree.

At each tree rank, however, the MSD radix sorting procedure of this invention processes the bins in order of size from fewest record entries to most record entries (smallest to largest). Therefore, the only time that bin sorting activity can increase the number of active bins is when the bin $B_s$ undergoing sort contains at least T entries. All other active bins in tree rank K have at least as many records as $B_s$. All active bins at tree rank $K-1$ each have at least as many entries as the parent bin of $B_s$ did before being distributed. Thus, in general, for any active tree rank k ($1 \leq k \leq K-1$), all active bins at level k must have at least as many entries as the $k^{th}$ rank ancestor bin of $B_s$ had before being distributed.

Consequently, if bin $B_s$ has $r_B$ entries, and $S_k$ is the number of active bins at rank k, then $S=S_1+S_2+\ldots+S_K$ is the total number of active bins in the sort tree when bin $B_s$ at rank K is undergoing distribution and $P=(S_1+1)(S_2+1)\ldots(S_K+1)$ is the product of the total number of bins at each active tree rank either awaiting distribution or on the path from the route bin to bin $B_s$.

Then $T \leq r_B \leq R/P$ defines the range of size for bin $B_s$. Thus, to find the maximum number of partially-filled blocks at any point during the distribution sorting procedure, the expression for S must be maximized subject to the condition that $T \leq R/P$.

Consider that each $S_k$ is valued between zero and $(M-1)$ and there may be as many as D different ranks. The resulting problem thus is one of maximizing the sum S while also minimizing the product P. This condition requires setting $S_k$ to the maximum value $(M-1)$ as much as possible so long as $P \leq R/T$. This further implies that S is maximized when $K = \log_M (R/T)$ and that each active rank from 1 to K has $(M-1)$ active bins awaiting distribution. More importantly, this condition implies that $S \leq (M-1) \log_M (R/T)$ and $r_B = T$ under such circumstances.

Consequently, if A is the maximum number of active bins required at any point during the process, then A must equal the largest value of $S+1$ (for $B_s$) plus the smaller of T or M (for distribution of $B_s$). This leads to the formula $$A = (M-1) \log_M (R/T) + \min (T, M) + 1$$

At no point during the sorting procedure of this invention are more than A reserved memory blocks only partially filled. Each partially-filled block may, at worst, contain only a single record. All remaining blocks of memory linked to a bin are completely filled. Thus, because each block provides contiguous memory space for B entries, the most blocks required at any point during the sorting procedure of this invention is $A+(R-A)/B$, which is exactly $A(1-1/B)$ more than the $R/B$ minimum possible number of blocks required to hold all records in the initial unsorted group. This represents only $A(B-1)$ additional entries over the theoretical minimum required.

A grows very slowly with respect to R. For instance, increasing R by a factor of M merely adds $M-1$ to A. Thus, for very large data sets, the MSD distributive sorting procedure of this invention requires only a relatively small amount of additional storage to process the sort. Moreover, by decreasing the block size B, by decreasing the key field representation size, and/or by increasing the size of T, this incremental extra storage amount can be made as small as desired.

For example, if $R=10,000,000$ and $T=1,000$, a procedure for sorting records with 16-byte key fields with $M=10$ requires no more than $A=47$ active bins at any time. For any reasonable block size B (say, $B=100$), the increased storage requirement (47 more blocks) is insignificant when compared to the minimum storage requirement (100,000 blocks) for all entries.

A Simpler Alternative Embodiment

The MSD distribution sorting procedure of this invention can be simplified at the expense of some efficiency in an alternative embodiment. The preferred method of this invention is to order the bins at each rank K according to size and to distribute bins from smallest to largest. A useful alternative procedure is to process the bins larger than T at each rank in any arbitrary order, such as from least MSD value to most, so long as bins smaller than T are first sorted. By setting T large enough, most of the block spaced assigned to active bins awaiting distribution are filled with entries. For example, forcing $T=B/2$ ensures that at least half of the block space is used in each block linked to an active bin and setting $T=4B/3$ ensures that at least two-thirds of the block space is filled. This assurance arises from the bin thresholding step where all bins of size less than T are immediately comparison-sorted and distributed to the output area, as in the preferred method of this invention. After this thresholding, all remaining active bins are above size T, ensuring that partially-filled block space is efficiently used.

Clearly, other embodiments and modifications of this invention will occur readily to those of ordinary skill in the art in view of these teachings. Therefore, this invention is to be limited only by the following claims, which include all such embodiments and modifications when viewed in conjunction with the above specification and accompanying drawing.

I claim:

1. A computer-implemented method for sorting a plurality R of records according to their key fields, each said key field having a plurality D of digits of radix M, wherein R, D and M are non-zero positive integers, said method comprising the steps of:
    (a) recursively distributing and collecting a group of representations of said key fields, each recursion including the ordered steps of
        (a.1) comparing each of said group of key fields against an extrinsic attribute and assigning said each key field to one of a plurality M of same-attribute subgroups, (a.2) assigning to each said same-attribute subgroup a bin count index representing the number of said plurality R of records having key fields that are smaller than the minimum said key field in said each same-attribute subgroup, and (a.3) sorting and moving the sorted key fields from each said same-attribute subgroup having a size less than a predetermined threshold T to a predetermined location in an output storage area, where said predetermined location corresponds to said bin count index and T is a non-zero positive integer; and (b) repeating said each recursion for the remaining undistributed said same-attribute subgroups.

2. The method of claim 1 wherein each said group and said subgroup of key field representations is stored in a unique bin in a data storage means, each said bin having a linked list of one or more storage blocks only one of which is not filled, each said storage block having contiguous memory space for up to a plurality B of said key field representations, where B is a positive integer greater than unity.

3. The method of claim 2 wherein said storage blocks are linked and released responsive to changes in the undistributed contents of said each bin.

4. The method of claim 3 wherein said extrinsic attribute for each said recursion is the most significant said key field digit remaining uncompared from all previous said recursions.

5. The method of claim 4 wherein said repeating step (b) is first performed on the smallest said remaining undistributed same-attribute subgroup.

6. The method of claim 4 wherein said repeating step (b) is first performed on the smallest said remaining same-attribute subgroup.

7. The method of claim 1 wherein said repeating step (b) is first performed on the smallest said remaining same-attribute subgroup.

8. The method of claim 1 wherein said extrinsic attribute for each said recursion is the most significant said key field digit remaining uncompared from all previous said recursions.

9. A system for sorting a plurality R of records according to their key fields, each said key field having a plurality D of digits of radix M, wherein R, D and M are non-zero positive integers, said system comprising:

bin storage means for storing groups of representations of said key fields;

output storage means for storing said records in key field order;

distributing means coupled to said bin storage means for comparing each of a group of said key fields against an extrinsic attribute and for assigning each key field to one of a plurality M of same-attribute subgroups;

counting means coupled to said distributing means for assigning to each said same-attribute subgroup a bin count index representing the number of said plurality R of records having key fields that are smaller than the minimum said key field in said each same-attribute subgroup; and threshold sorting means coupled to said bin storage means for first sorting and moving the sorted key field representations from each said same-attribute subgroup having a size less than a predetermined threshold T to a predetermined location in said output storage means, where said predetermined location corresponds to said bin count index and T is a non-zero positive integer.

10. The system of claim 9 further comprising:
a plurality of bins in said bin storage means, each said bin having a linked list of one or more blocks of contiguous storage space only one of which is not filled, each said block having contiguous space for up to a plurality B of said key field representations, where B is a positive integer greater than unity.

11. The system of claim 10 further comprising:
bin management means coupled to said bin storage means for linking and releasing said blocks of storage contiguous space to any said bin responsive to changes in the undistributed contents of said any bin.

12. The system of claim 11 wherein said extrinsic attribute is the most significant said key field digit remaining uncompared from previous distributions.

13. The system of claim 12 further comprising:
bin ordering means coupled to said bin storage means for ordering said same-attribute subgroups by size.

14. The system of claim 12 further comprising:
bin ordering means coupled to said bin storage means for ordering said same-attribute subgroups by size.

15. The system of claim 9 further comprising:
bin ordering means coupled to said bin storage means for ordering said same-attributes subgroups by size.

16. The system of claim 9 wherein said extrinsic attribute is the most significant said key field digit remaining uncompared from previous distributions.

* * * * *